R. Humphrey.
Making Ferrules.
N° 30,405.      Patented Oct. 16, 1860.

Witnesses:
J W Coombs
R S Spencer

Inventor:
R Humphrey
per Munn H Co
Attorneys

UNITED STATES PATENT OFFICE.

R. HUMPHREY, OF UNIONVILLE, CONNECTICUT.

PUNCH.

Specification forming part of Letters Patent No. 30,405, dated October 16, 1860; Application for Reissue filed December 2, 1872.

*To all whom it may concern:*

Be it known that I, R. HUMPHREY, of Unionville, in the county of Hartford and State of Connecticut, have invented a new and Improved Counter-Die and Punch for Cutting and Forming Metal Ferrules; and I do hereby declare that the following is a full, clear, and exact description thereof, reference being had to the accompanying drawings, making part of this specification, in which—

Figure 2:
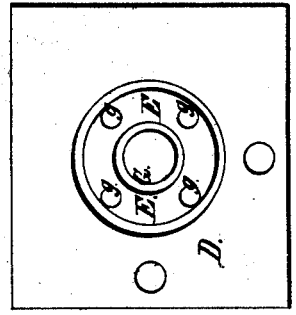
Figure 1:
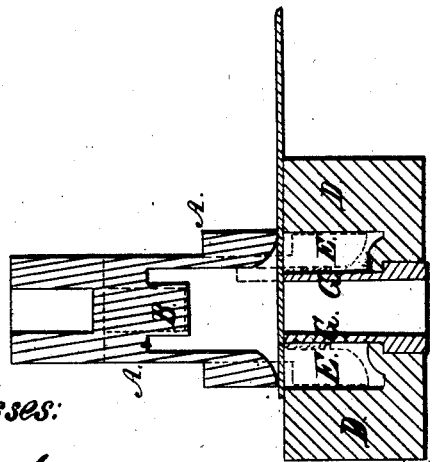
Figure 3:
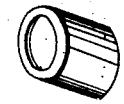
Figure 4:
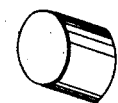
Figure 5:
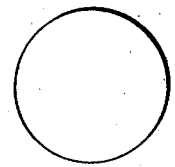

Figure 1 represents a section taken in a vertical plane through the middle of the improved punch and die showing in red lines the positions of the punch in cutting out and forming a ferrule. Fig. 2 is a top view of the die plate showing the male and female portions of the die to receive the punch. Figs. 3, 4, and 5 show the ferrule in its three stages of completion.

Similar letters of reference indicate corresponding parts in Figs. 1 and 2.

The object of the invention is to produce a tool by the use of which the manufacture of metal ferrules may be greatly facilitated.

To enable those skilled in the art to fully understand my invention I will proceed to describe its construction and operation.

The punch consists of a shank A, with its end drilled out, the diameter of the ferrule to be made by it, leaving a center punch B, of a cylindrical shape which is equal in diameter to the hole in the top of the ferrule. The cutting part of the punch A, is at the outer edge and this edge is formed by rounding off the inner edge as shown in Fig. 1, which rounded surface serves another important end, as will be hereinafter described. This punch (or a number of them) is to be placed over the die plate D, and made to work up and down in suitable guides, and any suitable lever power may be applied to force the punch down in the operation of punching out and forming the ferrules.

The die-plate has a counter die E, of sufficient diameter to admit the die portion A, to pass down into it, and it has also a steel tube G, with a hole through it that serves as a counter die for the die or solid punch B, the outer edge of which tube is rounding as shown in Fig. 1.

Now in manufacturing ferrules with this punch and die the sheet metal is passed over the die plate D, and under the punch, it is then brought down with a gradual but powerful pressure and cuts out first a circular disk Fig. 3, which, at the same time it is cut, is bent over the end of tube G, the pressure being kept up, and the die forced home in the counter-die, the disk will be drawn down over and around the tube G, and the ferrule, Fig. 5, will be produced, but before the pressure ceases the punch B, will have cut out a circular piece from the head of the ferrule, which will fall through the tube G. The punch now being raised leaves the ferrule on the tube, to be loosened and knocked off by pins that will pass up through holes $g, g$, in the bottom of the counter die E, or by any other suitable device, the ferrule when completed by this counter-die and punch is represented by Fig. 5.

After the first operation of cutting out the circular plate, (Fig. 3), by the extreme edges of the punch and counter die the metal begins to assume first a conical, then a cylindrical shape and it is important that the under surface of the punch should be rounding, as it is shown in the drawing, in order to carry the metal down around the tube G, without cutting or otherwise injuring it, then after the metal receives its final bending it is confined closely around the tube G, by passing the edge of this tube, the three operations, first, of cutting out a circular plate, then bending it into a tube, then cutting out the end of this tube, are all performed by giving to the punch a downward pressure, as above stated.

Having thus described my invention, what I claim as new, and desire to secure by Letters Patent, is—

Constructing the punch and die plate in the manner substantially as shown, to wit:— the punch A having an interior cavity with rounded edges to form a cutting edge and a solid punch B, projecting from the upper part of the cavity, and the die plate D having a central hollow mandrel G, rising through its center, so that when the sheet metal is placed between the die plate and
5 punch A, the latter on descending will first cut out the blank, then bend the same into the form of a ferrule and the punch an opening in the upper end thereof, thus completing the ferrule, all at one operation or motion of the punch A, as herein set forth.

R. HUMPHREY.

Witnesses:
 TRUMAN SANFORD,
 F. A. TRYON.